US012643045B2

(12) United States Patent
Dorn et al.

(10) Patent No.: US 12,643,045 B2
(45) Date of Patent: Jun. 2, 2026

(54) ARTIFICIAL INTELLIGENCE (AI)-BASED GENERATION OF AMBISONIC SOUNDFIELD

(71) Applicant: Sony Interactive Entertainment Inc., Tokyo (JP)

(72) Inventors: Victoria Dorn, Hayward, CA (US); Brandon Sangston, Foster City, CA (US); Anders Lykkehoy, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 519 days.

(21) Appl. No.: 18/164,507

(22) Filed: Feb. 3, 2023

(65) Prior Publication Data

US 2024/0261685 A1 Aug. 8, 2024

(51) Int. Cl.
| | |
|---|---|
| *A63F 13/54* | (2014.01) |
| *A63F 13/52* | (2014.01) |
| *A63F 13/60* | (2014.01) |
| *H04S 7/00* | (2006.01) |

(52) U.S. Cl.
CPC ............. *A63F 13/54* (2014.09); *A63F 13/52* (2014.09); *A63F 13/60* (2014.09); *H04S 7/302* (2013.01); *H04S 2400/11* (2013.01); *H04S 2400/13* (2013.01); *H04S 2400/15* (2013.01); *H04S 2420/11* (2013.01)

(58) Field of Classification Search
CPC .......... A63F 13/52; A63F 13/54; A63F 13/60
See application file for complete search history.

(56) References Cited

U.S. PATENT DOCUMENTS

| | | | | |
|---|---|---|---|---|
| 10,667,074 B2 * | 5/2020 | Kim | ........................ | A63F 13/54 |
| 11,997,463 B1 * | 5/2024 | Sheaffer | ................. | G06N 20/00 |
| 2020/0154229 A1 * | 5/2020 | Habets | .................... | H04S 7/303 |
| 2020/0396555 A1 * | 12/2020 | Cartwright | ............ | H04M 3/568 |
| 2020/0402521 A1 * | 12/2020 | Olivieri | .................. | H04L 65/75 |
| 2021/0160644 A1 * | 5/2021 | Olivieri | ............ | H04N 21/42202 |

(Continued)

OTHER PUBLICATIONS

Mroz Bartlomie, et al: "Production of six-degrees-of-freedom (6DoF) navigable audio using 30 Ambisonic microphones", 2021 Immersive and 3D Audio: From Architecture to Automotive (I3DA), IEEE, Sep. 8, 2021 (Sep. 8, 2021), pp. 1-5 (Year: 2021).*

(Continued)

*Primary Examiner* — Chase E Leichliter
(74) *Attorney, Agent, or Firm* — Kilpatrick Townsend & Stockton LLP

(57) ABSTRACT

A specification of sound producing elements within a graphical scene is provided as input to an artificial intelligence (AI) model. The specification of the sound producing elements includes a description of each sound producing element and a position of each sound producing element within a three-dimensional (3D) space relative to a virtual ambisonic microphone location within the graphical scene. A library of sound effects is also provided as input to the AI model. The AI model is executed to automatically generate an ambisonic soundfield for the specification of sound producing elements within the graphical scene from the library of sound effects. The automatically generated ambisonic soundfield is conveyed to a client computing system for post-processing by a sound designer.

20 Claims, 6 Drawing Sheets

(56) References Cited

U.S. PATENT DOCUMENTS

| | | | |
|---|---|---|---|
| 2022/0150657 A1* | 5/2022 | Thiergart | ................ H04S 7/302 |
| 2024/0055024 A1* | 2/2024 | Dzierzek | .............. G11B 27/031 |
| 2024/0147178 A1* | 5/2024 | Clavel | .................... G06F 3/165 |
| 2024/0220866 A1* | 7/2024 | Faro Sertage | ......... G06V 10/82 |
| 2024/0261685 A1* | 8/2024 | Dorn | ...................... H04S 7/302 |

OTHER PUBLICATIONS

Mroz Bartlomiej et al., "Production of Six-Degrees-of-Freedom (6DoF) Navigable Audio Using 30 Ambisonic Microphones," 2021 Immersive and 3D Audio: From Architecture to Automotive (I3DA), IEEE, Sep. 8, 2021, pp. 1-5.
Kim Hansung et al., "Acoustic Room Modelling Using 360 Stereo Cameras," IEEE Transactions on Multimedia, vol. 23, Nov. 16, 2020, pp. 4117-4130.
PCT/US2024/014113, International Search Report and Written Opinion, Mailed May 21, 2024, 11 pages.

\* cited by examiner

Fig. 1

| ID | Sound Description | Position (x, y, z) | Projection Direction | Volume | Effect(s) |
|---|---|---|---|---|---|
| 203 | horse | 0, 0, -2 | down | -2 dB | effect 1 |
| 205 | coyote howling | 100, -20, -6 | up | -1 dB | effect 2 |
| 207 | rattlesnake rattling | 10, 10, -8 | up | 0 dB | effect 3 |
| 209 | hawk screaming | 50, 0, 30 | down | 0 dB | effect 2 |
| 211 | person breathing | 0, 0, 0 | point | 0 dB | none |
| 213 | door creaking | 75, 20, 0 | point | -2 dB | none |
| 215 | wind through tree | 15, 15, 10 | point | 0 dB | none |
| 217 | tumbleweeds | 15, 15, 10 | point | 0 dB | none |

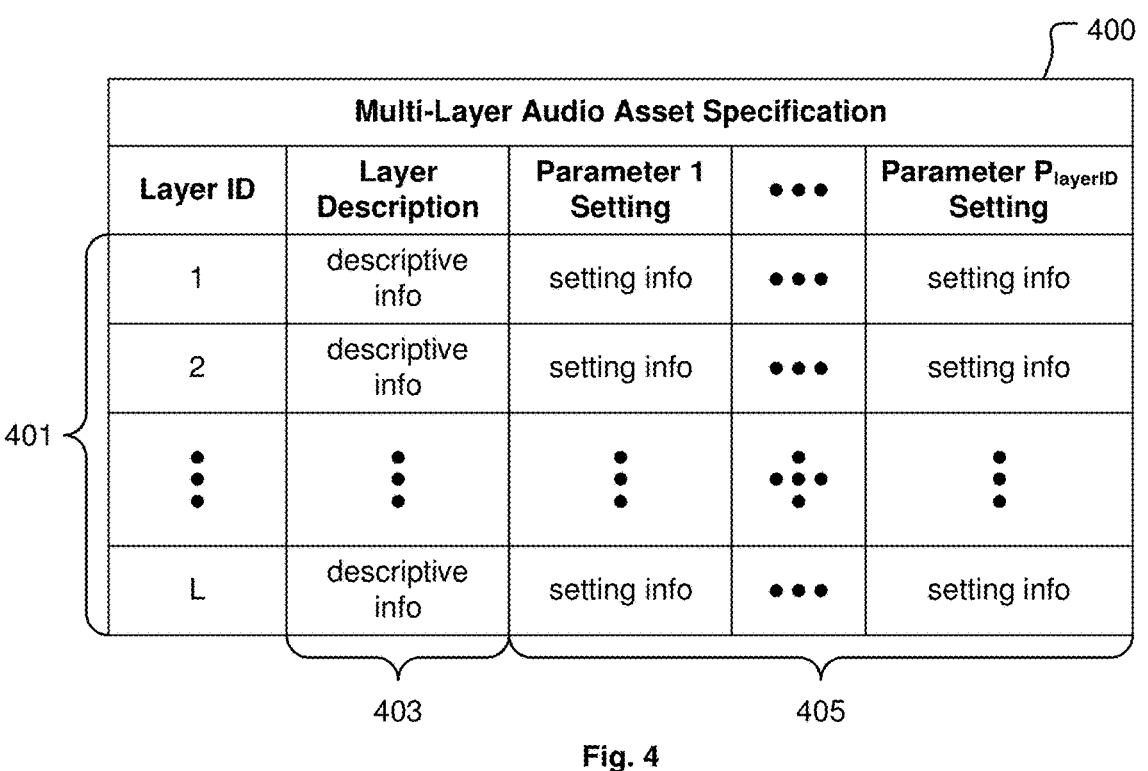

| Multi-Layer Audio Asset Specification | | | | |
|---|---|---|---|---|
| Layer ID | Layer Description | Parameter 1 Setting | ••• | Parameter P$_{layerID}$ Setting |
| 1 | descriptive info | setting info | ••• | setting info |
| 2 | descriptive info | setting info | ••• | setting info |
| ⋮ | ⋮ | ⋮ | ⋮ | ⋮ |
| L | descriptive info | setting info | ••• | setting info |

Fig. 4

| Example Multi-Layer Audio Asset Specification for Horse | | | | |
|---|---|---|---|---|
| Layer ID | Layer Description | Parameter 1 Setting | Parameter 2 Setting | Parameter 3 Setting |
| 1 | hooves striking ground | hooves.mp3 | volume = -2 dB | EQ settings |
| 2 | breathing | horsebreathing.mp3 | volume = -5 dB | EQ settings |
| 3 | neighing | horseneighing.mp3 | volume = -5 dB | EQ settings |

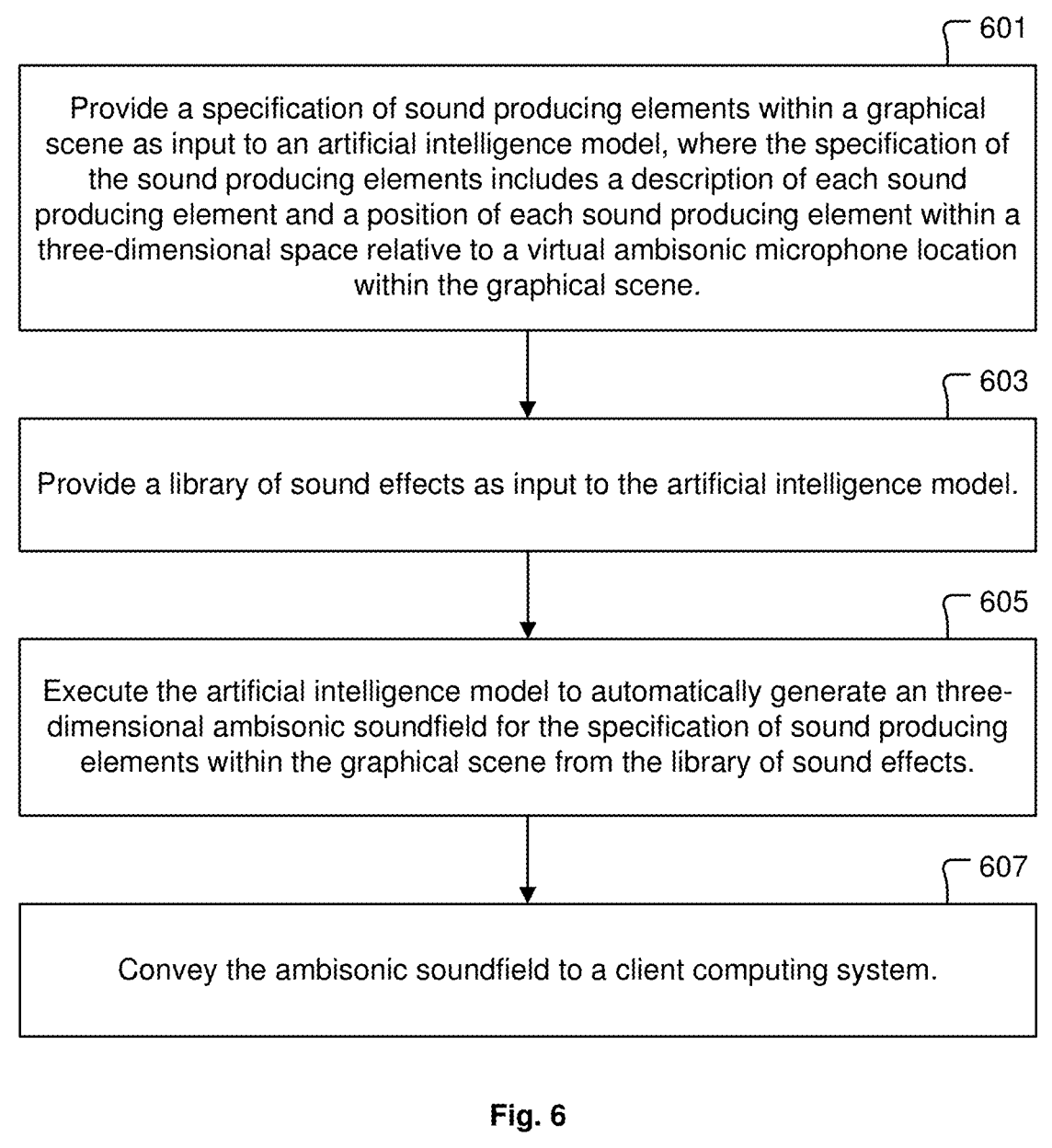

Provide a specification of sound producing elements within a graphical scene as input to an artificial intelligence model, where the specification of the sound producing elements includes a description of each sound producing element and a position of each sound producing element within a three-dimensional space relative to a virtual ambisonic microphone location within the graphical scene.

┌─ 603

Provide a library of sound effects as input to the artificial intelligence model.

┌─ 605

Execute the artificial intelligence model to automatically generate an three-dimensional ambisonic soundfield for the specification of sound producing elements within the graphical scene from the library of sound effects.

┌─ 607

Convey the ambisonic soundfield to a client computing system.

Fig. 6

ARTIFICIAL INTELLIGENCE (AI)-BASED GENERATION OF AMBISONIC SOUNDFIELD

BACKGROUND OF THE INVENTION

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations, particularly with regard to audio presentation, to provide for increased player engagement and enhanced player experience. It is within this context that implementations of the present disclosure arise.

SUMMARY OF THE INVENTION

In an example embodiment, a method is disclosed for generating an ambisonic soundfield. The method includes providing a specification of sound producing elements within a graphical scene as input to an artificial intelligence model. The specification of the sound producing elements includes a description of each sound producing element and a position of each sound producing element within a three-dimensional space relative to a virtual ambisonic microphone location within the graphical scene. The method also includes providing a library of sound effects as input to the artificial intelligence model. The method also includes executing the artificial intelligence model to automatically generate an ambisonic soundfield for the specification of sound producing elements within the graphical scene from the library of sound effects. The method also includes conveying the ambisonic soundfield to a client computing system.

In an example embodiment, a system for automatically generating an ambisonic soundfield is disclosed. The system includes an input processor configured to receive a specification of sound producing elements within a graphical scene. The specification of the sound producing elements includes a description of each sound producing element and a position of each sound producing element within a three-dimensional space relative to a virtual ambisonic microphone location within the graphical scene. The system also includes a library of sound effects. The system also includes an artificial intelligence model configured to automatically generate an ambisonic soundfield for the specification of sound producing elements within the graphical scene from the library of sound effects. The system also includes an output processor configured to convey the ambisonic soundfield to a client computing system.

BRIEF DESCRIPTION OF THE DRAWINGS

FIG. 1 shows a diagram of a tool for AI-based automatic generation of a 3D ambisonic soundfield for a graphical scene, in accordance with some embodiments.

FIG. 4 shows an example schema for defining a multi-layer audio asset, in accordance with some embodiments.

FIG. 5 shows an example schema for a multi-layer audio asset that provides sound for the horse of FIGS. 2A and 2B, in accordance with some embodiments.

FIG. 6 shows a flowchart of a method for generating an ambisonic soundfield, in accordance with some embodiments.

DETAILED DESCRIPTION OF THE INVENTION

Figure 2A:
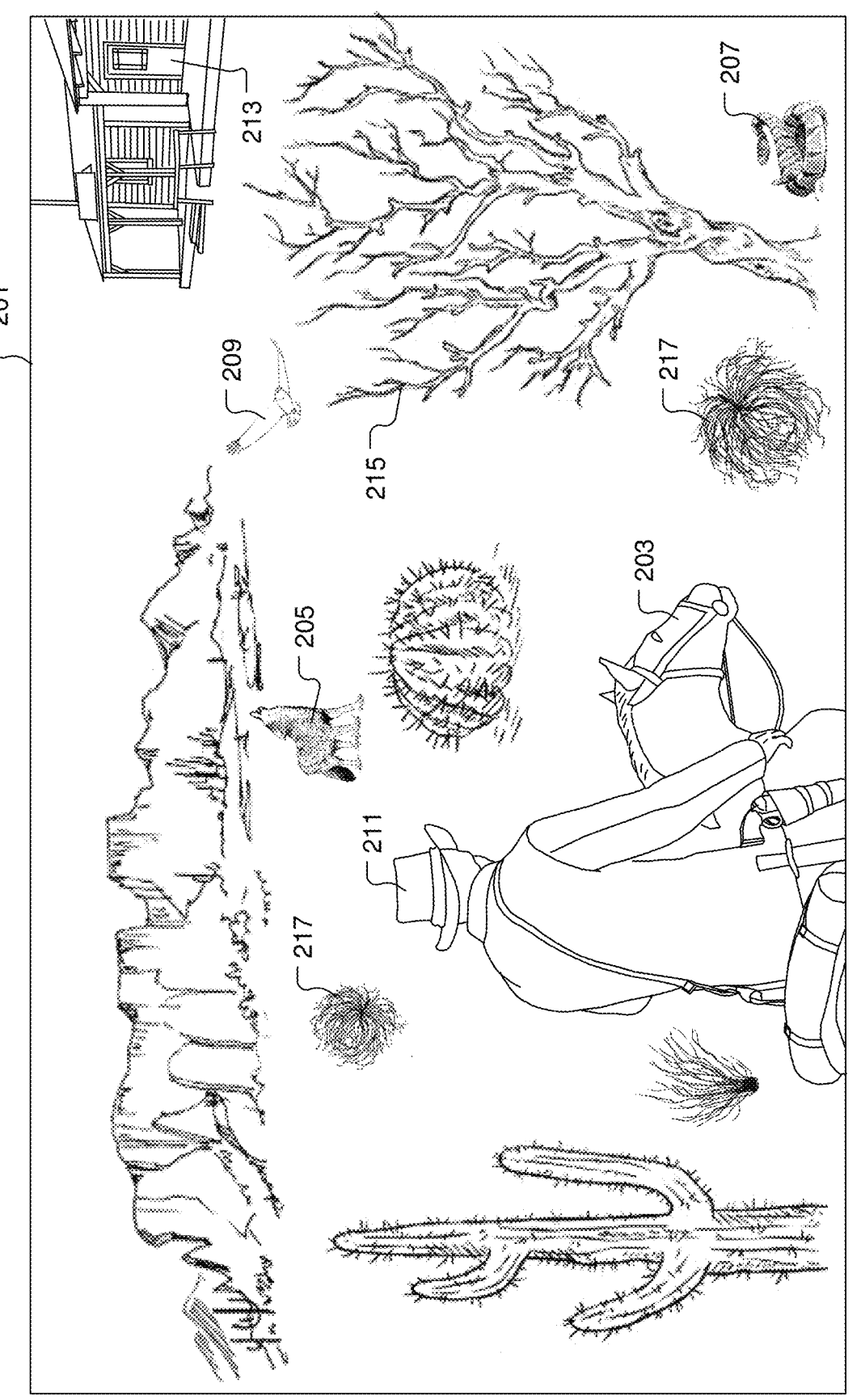
FIG. 2A shows an example graphical scene for purposes of illustrating how the scene description may be composed, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Many modern computer applications, such as video games, virtual reality applications, augmented reality applications, virtual world applications, etc., generate immersive three-dimensional (3D) virtual environments in which the user of the app is virtually surrounded by various visual objects and sounds. Many such applications also strive to achieve a maximum level of realism, so that the user feels a greater sense of alternative reality when executing the application. Of course, the real world is incredibly complex in its diversity of content and with its essentially infinite number of variations on almost every perceivable object. Therefore, it is no small challenge to create computer applications that satisfy natural human expectations with regard to what constitutes an acceptable minimum level of realism in virtual reality, particularly with regard to audio effects and 3D immersive soundfield design. The generation of realistic 3D soundfields for a graphical scenes can require a tremendous amount of creative/design work, which corresponds to increased application development expense and longer application production schedules. Therefore, in this regard, various embodiments are disclosed herein for leveraging AI technology to improve the efficiency with which 3D ambisonic soundfields can be developed and assessed for use in computer applications.

The term computer application as used herein refers to essentially any type of computer application in which graphics and/or sounds are presented to a user of the computer application, particularly where the context of the computer application benefits from having multiple variations of a given graphic and/or a given sound. In some embodiments, the computer application is executed on a cloud computing system and the associated video and audio stream is transmitted over the Internet to a client computing system. In some embodiments, the computer application is executed locally on the client computing system. In some embodiments, the computer application is executed on both the cloud computing system and the local client computing system. In some embodiments, the computer application is a video game. In some embodiments, the computer application is a virtual reality application. In some embodiments, the computer application is an augmented reality application. In some embodiments, the computer application is a virtual world application. However, it should be understood that the systems and methods disclosed herein for leveraging AI technology to improve the efficiency with which 3D ambisonic soundfields are developed and assessed can be used with essentially any computer application.

Some computer applications, particularly video games, have sounds designed for some in-game features, but not for all in-game features. It is possible for players of the video game to tell when the video game does not include all of the sounds for all of the in-game objects/features that should be making sounds, especially in 3D video games with 3D soundfields. Also, for some video games, it is difficult for sound designers to create convincing 3D soundfields. To address these challenges, method and systems are disclosed herein in which an artificial intelligence (AI) model is used to automatically generate a 3D ambisonic soundfield for a game scene, which can then be conveyed to a sound designer as a starting point for developing a complete and refined 3D ambisonic soundfield for the game scene. The methods and systems disclosed herein provide for increased realism in the 3D immersive environment by accepting an input that may be an image of a game scene or game scene description or metadata and then automatically generating a 3D ambisonic soundfield for the input. The methods and systems disclosed herein for AI-based automatic generation of 3D ambisonic soundfields is particularly useful for filling in gaps (missing sounds) in 3D audio for a 3D game scene and for reducing manual sound designer workload. In some embodiments, the methods and systems disclosed herein for AI-based automatic generation of 3D ambisonic soundfields are implemented as a tool for assisting a sound designer in creating sounds for various in-game objects and game scenes as part of the video game development process.

Figure 1:
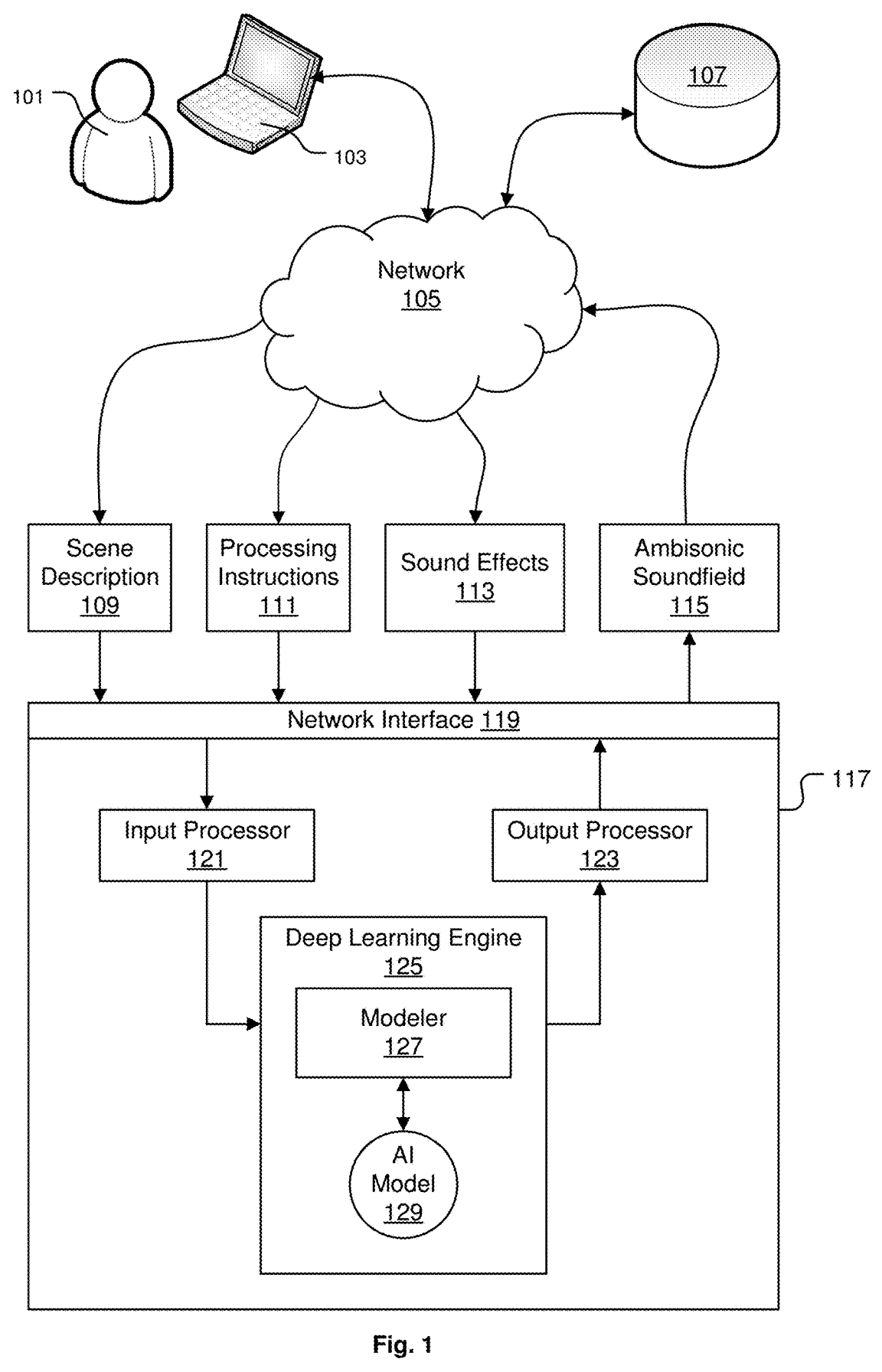

FIG. 1 shows a diagram of a tool 117 for AI-based automatic generation of a 3D ambisonic soundfield for a graphical scene, in accordance with some embodiments. In some embodiments, the tool 117 is in bi-directional data communication with a client computing system 103 through a network 105, e.g., Internet. Also, in some embodiments, the tool 117 is in bi-directional data communication with a data storage system 107 through the network 105. A sound designer 101 working at the client computing system 103 provides input to the tool 117 that includes one or more graphical scene description(s) 109 for which 3D ambisonic soundfields are to be generated by the tool 117. In some embodiments, the graphical scene description 109 is a specification of all sound producing elements within the graphical scene. In some embodiments, the specification of the sound producing elements includes a description of each sound producing element (what it is, what type of sound it makes) and a position of each sound producing element within a 3D space relative to a virtual ambisonic microphone location within the graphical scene. For example, in some embodiments, an origin of a 3D spatial coordinate system is considered to be located at the virtual ambisonic microphone location within the graphical scene. The coordinates of each sound producing element within the 3D spatial coordinate system within the graphical scene is included in the specification of the sound producing elements for the graphical scene. In some embodiments, the graphical scene is generated for a video game, and the virtual ambisonic microphone location within the graphical scene is the listener position, e.g., game player position, within the graphical scene.

Also, in some embodiments, specification of the sound producing elements for the graphical scene includes a direction of sound projection for each sound producing element within the graphical scene. In some embodiments, the direction of sound projection may be isotropic (point source), such as that sound projects out from the sound producing element substantially uniformly in all directions. Or, in some embodiments, the direction of sound projection may be narrow, such that the sound projects out from the sound producing element is a particular narrow direction (conical direction). In these cases, a unit vector defined relative to the 3D spatial coordinate system can be specified to identify the direction of sound projection. Also, other features such as an angular width of an audio projection cone centered on the unit vector can be specified for the sound producing element. Also, in some embodiments, specification of the sound producing elements for the graphical scene includes a volume (or relative volume) of each sound producing element within the graphical scene. Also, in some embodiments, specification of the sound producing elements for the graphical scene includes specification of one or more audio effects to be applied to particular sound producing elements within the graphical scene, such as attenuation curves, reverb, oscillation, pan/tilt, distortion, among essentially any other audio effect. Therefore, it should be understood that the scene description 109 provided to the tool 117 provides a complete specification of all sound producing elements present in the graphical scene with regard to the type of sound they make, the sound location, and the sound direction.

Figures 2B, 3:
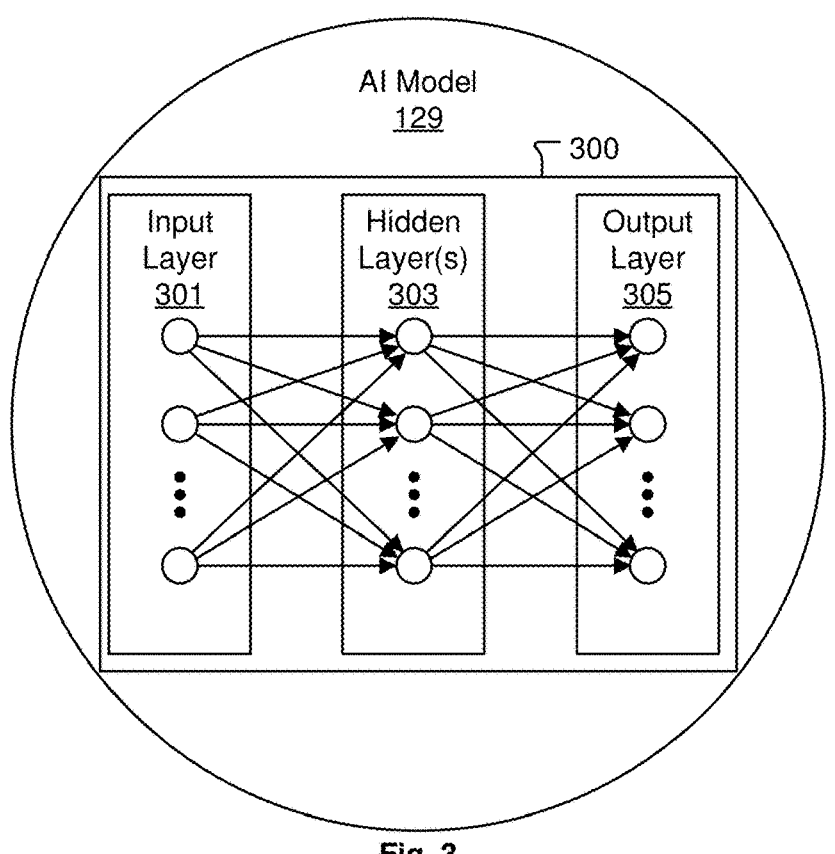
FIG. 2B shows an example specification of the sound producing elements for the graphical scene of FIG. 2A, in accordance with some embodiments.
FIG. 3 shows an example AI model that implements a neural network for learning the intricacies of how to generate a 3D ambisonic soundfield based on an input graphical scene description, in accordance with some embodiments.

FIG. 2A shows an example graphical scene 201 for purposes of illustrating how the scene description 109 may be composed, in accordance with some embodiments. FIG. 2B shows an example specification of the sound producing elements for the graphical scene of FIG. 2A, in accordance with some embodiments. The scene 201 includes a number of sound producing elements, including a horse 203, a coyote 205, a snake 207, a hawk 209, a person 211, a creaking door 213, wind blowing through a tree 215, and tumbleweeds 217 moving across the ground. A centroid of the head of the person 211 is considered to be the virtual ambisonic microphone location within the 3D space of the graphical scene 201. In this manner, the 3D ambisonic soundfield will be generated from the hearing perspective of the person 211 as shown in the graphical scene 201, which is assumed to represent the player within the video game. The specification of the sound producing elements as shown in FIG. 2B includes a description of each sound producing element to identify the type of sound being produced. In various embodiments, the sound descriptions can be simple or more complex. For example, rather than simply describe the horse as a horse, the sound description could state something like a horse at slow trot on packed desert ground. FIG. 2B shows that each sound producing element has its location identified relative to the virtual ambisonic microphone location within the 3D space of the graphical scene 201. A sound projection direction is specified for each of the sound producing objects, along with a volume level and any desired sound effects. It should be understood that the graphical scene of FIG. 2A and the corresponding example specification of the sound producing elements of FIG. 2B represent a simplified example for descriptive purposes. In practice, the graphical scenes and corresponding specification of the sound producing elements can be much more complex than what is depicted in FIGS. 2A and 2B.

With reference back to FIG. 1, in some embodiments, the sound designer 101 working at the client computing system 103 can also provide processing instructions 111 as input to the tool 117. For example, in some embodiments, the processing instructions 111 can direct the tool 117 to ignore particular sound producing elements within the scene description 109. For example, with regard to FIGS. 2A and 2B, the processing instructions 111 may direct the tool 117 to ignore the person 211 and the tumbleweeds 217 as sound producing elements within the graphical scene 201. In various embodiments, the processing instructions 111 can include essentially any type of instruction to direct operation of the tool 117.

In some embodiments, sound effects 113 are provided as input to the tool 117. For example, in some embodiments, multiple various libraries of different sound effects 113 are provided as input to the tool 117 for use in generating the 3D ambisonic soundfield for the scene description 109 in accordance with any other processing instructions 111 provided by the sound designer 101. In some embodiments, the sound effects 113 contain monaural or multichannel audio assets which may be encoded to a 3D ambisonic soundfield 115 in accordance with the processing instructions 111. In some embodiments, the sound effects 113 may also contain pre-encoded ambisonic audio assets which may be used in generating the 3D ambisonic soundfield 115. In various embodiments, the sound effects 113 include one or more libraries of monaural audio assets that may be associated with sound-emitting graphical objects within the graphical scene description 109. In some embodiments, the multiple various libraries of different sound effects 113 are categorized and labeled to provide for searching of different sound effects by name.

In some embodiments, the tool 117 includes a network interface 119 configured to receive and process incoming data communication signals/packets and prepare and transmit outgoing data communication signals/packets. In various embodiments, the network interface 119 is configured to operate in accordance with any known network/Internet protocol for data communication. In some embodiments, the tool 117 includes an input processor 121. The input processor 121 is configured to receive input from the sound designer 101 by way of the network interface 119. The input processor 121 operates to format the received input for provision as input to a deep learning engine 125. In some embodiments, the input includes the scene description 109 and the processing instructions 111, along with any associated metadata.

In some embodiments, the tool 117 includes the deep learning engine 125, which includes an AI modeler engine 127 and an AI model 129. The AI modeler engine 127 is configured to build and/or train the AI model 129 using training data. In various embodiments, deep learning (also referred to as machine learning) techniques are used to build the AI model 129 for use in generation of the 3D ambisonic soundfield for the graphical scene as specified in the scene description 109. In various embodiments, the AI model 129 is built and trained based on training data that includes volumes of reference 3D ambisonic soundfield representations and corresponding scene descriptions. For example, the sound designer's 3D ambisonic soundfield portfolio, including associated graphical scene descriptions, can be used as training data for the AI model 129. In some embodiments, the AI model 129 is trained based on some success criteria (e.g., sound designer 101 approval), such as following one path over another similar path through the AI model 129 that is more successful in terms of the success criteria. In some embodiments, the success criteria is validation/approval of a generated 3D ambisonic soundfield by the sound designer 101. In this manner, the AI model 129 learns to take the more successful path. In various embodiments, the training data for the AI model 129 includes any data that is relevant to understanding how the sound designer 101 would go about creating a 3D ambisonic soundfield for a given graphical scene description 109. The AI model 129 is continually refined through the continued collection of training data, and by comparing new training data to existing training data to facilitate use of the best training data based on the success criteria. Once the AI model 129 is sufficiently trained, the AI model 129 can be used to automatically generate the 3D ambisonic soundfield 115 for an input scene description 109 in accordance with any input processing instructions 111. More specifically, in some embodiments, the AI model 129 operates to select and encode monaural audio assets from within the sound effects 113 into the 3D ambisonic soundfield 115 using the graphical object positions and other processing instructions/metadata in the graphical scene description 109. In various embodiments, the sound effects 113 provide a library of source audio assets which the AI model 129 can intelligently combine into the 3D ambisonic soundfield 115. The library of source audio assets in the sound effects 113 can be provided in essentially any audio format that can be interpreted, processed, and ultimately spatialized according to the graphical scene description 109, processing instructions 111, and AI model 129. Because the 3D ambisonic soundfield 115 is spatialized, it is particularly useful for ambience sounds.

In some embodiments, the tool 117 includes an output processor 123. In various embodiments, the output processor 123 is configured to receive the output generated by the deep learning engine 125 and prepare the output for transmission to the sound designer 101 by way of the network interface 119 and/or for storage in the data store 107. In some embodiments, the data store 107 is also used for storing data associated with operation of the tool 117. It should be understood that the data store 107 can be either part of the tool 117, or can be a cloud data storage system that is accessible by the tool 117 over the network 105, or can be essentially any other type of data storage that is accessible by the tool 117.

In some embodiments, the output processor 123 is configured to provide the automatically generated 3D ambisonic soundfield 115 as output to the sound designer 101 by way of the network interface 119 and network 105. In some embodiments, the 3D ambisonic soundfield 115 output by the tool 117 is provided to the sound designer 101 as digital audio workstation (DAW) project file. In some embodiments, the graphical scene description 109 varies as a function of time. Therefore, in these embodiments, the 3D ambisonic soundfield 115 output by the tool 117 will also vary as a function of time. In these embodiments, the DAW project file output by the tool 117 includes a set of audio tracks for the various sound producing elements within the graphical scene as a function of time. The sound designer 101 is able to open the DAW project file and edit/refine the 3D ambisonic soundfield that was automatically generated by the tool 117. In this manner, the tool 117 provides a way to automatically generate a starting point for the 3D ambisonic soundfield for a graphical scene that can be worked from the sound designer 101 as part of the computer application, e.g., video game, development process. In addition to generating the 3D ambisonic soundfield, 115 the tool 117 can also output metadata that lists the different sounds that were chosen, the attenuation curves that were used, the reverb and/or the reverb settings that were used, and/or other sound design settings. The metadata can be output in different formats. For example, a DAW project that shows a time line of where sounds occurred can be output by the tool 117. The sound designer 101 can use the output DAW timeline as a starting point for a sound design for a scene within the video game. The DAW project has multiple tracks and audio parameters that can be adjusted by the sound designer 101 through the DAW system. It should be appreciated that the automatic generation of the 3D ambisonic soundfield 115 by the tool 117 saves a lot of sound designer 101 work time by giving the sound designer 101 a good starting point, rather than having to start from a blank project. The output of the tool 117 allows the sound designer 101 to focus on more important aspects of the sound design without having to leave some sound sources unaddressed due to lack of time. The tool 117 improves the efficiency (reduces time required) for sound design and reduces the more tedious tasks of the sound designer 101.

FIG. 3 shows an example AI model 129 that implements a neural network 300 for learning the intricacies of how to generate a 3D ambisonic soundfield based on an input graphical scene description 109, in accordance with some embodiments. Given the input graphical scene description 109, the AI model 129 can analyze the input and provide an appropriate response to the input. The AI modeler engine 127 is configured to build the AI model 129 as needed to learn about the 3D ambisonic soundfield generation process. In various embodiments, the deep learning engine 125 utilizes AI, including deep learning algorithms, reinforcement learning, or other AI-based algorithms to build and train the AI model 129. The deep learning engine 125 may be configured to continually refine the trained AI model 129 given any updated training data. More particularly, during the learning and/or modeling phase, the training data is used by the deep learning engine 125 to learn how a sound designer 101 creates a 3D ambisonic soundfield for a given graphical scene.

In various embodiments, the neural network 300 can be implemented as a deep neural network, a convolutional deep neural network, and/or a recurrent neural network using supervised or unsupervised training. In some embodiments, the neural network 300 includes a deep learning network that supports reinforcement learning, or rewards based learning (e.g., through the use of success criteria, success metrics, etc.). For example, in some embodiments, the neural network 300 is set up as a Markov decision process (MDP) that supports a reinforcement learning algorithm. The neural network 300 represents a network of interconnected nodes, such as an artificial neural network. In FIG. 3, each circle represents a node. Each node learns some information from the training data. Knowledge can be exchanged between the nodes through the interconnections. In FIG. 3, each arrow between nodes represents an interconnection. Input to the neural network 300 activates a set of nodes. In turn, this set of nodes activates other nodes, thereby propagating knowledge about the input. This activation process is repeated across other nodes until an output is provided. The example neural network 300 includes a hierarchy of nodes. At the lowest hierarchy level, an input layer 301 exists. The input layer 301 includes a set of input nodes. For example, in some embodiments, each of the input nodes of the input layer 301 is mapped to a corresponding instance of a sound producing element within a graphical scene. In some embodiments, intermediary predictions of the AI model 129 are determined through a classifier that creates labels, such as outputs, features, nodes, classifications, etc. At the highest hierarchical level, an output layer 305 exists. The output layer 305 includes a set of output nodes. Each output node represents a 3D ambisonic sound for a given sound producing element within the graphical scene.

In some embodiments, one or more hidden layer(s) 303 exists within the neural network 300 between the input layer 301 and the output layer 305. The hidden layer(s) 303 includes "X" number of hidden layers, where "X" is an integer greater than or equal to one. Each of the hidden layer(s) 303 includes a set of hidden nodes. The input nodes of the input layer 301 are interconnected to the hidden nodes of first hidden layer 303. The hidden nodes of the last ("X$^{th}$") hidden layer 303 are interconnected to the output nodes of the output layer 305, such that the input nodes are not directly interconnected to the output nodes. If multiple hidden layers 303 exist, the input nodes of the input layer 301 are interconnected to the hidden nodes of the lowest (first) hidden layer 303. In turn, the hidden nodes of the first hidden layer 303 are interconnected to the hidden nodes of the next hidden layer 303, and so on, until the hidden nodes of the highest ("X$^{th}$") hidden layer 303 are interconnected to the output nodes of the output layer 305.

An interconnection connects two nodes in the neural network 300. The interconnections in the example neural network 300 are depicted by arrows. Each interconnection has a numerical weight that can be learned, rendering the neural network 300 adaptive to inputs and capable of learning. Generally, the hidden layer(s) 303 allow knowledge about the input nodes of the input layer 301 to be shared among all the tasks corresponding to the output nodes of the output layer 305. In this regard, in some embodiments, a transformation function $f$ is applied to the input nodes of the input layer 301 through the hidden layer(s) 303. In some cases, the transformation function $f$ is non-linear. Also, different non-linear transformation functions $f$ are available including, for instance, a rectifier function $f(x)=\max(0,x)$.

In some embodiments, the neural network 300 also uses a cost function c to find an optimal solution. The cost function c measures the deviation between the prediction that is output by the neural network 300 defined as $f(x)$, for a given input x and the ground truth or target value y (e.g., the expected result). The optimal solution represents a situation where no solution has a cost lower than the cost of the optimal solution. An example of a cost function c is the mean squared error between the prediction and the ground truth, for data where such ground truth labels are available. During the learning process, the neural network 300 can use back-propagation algorithms to employ different optimization methods to learn model parameters (e.g., learn the weights for the interconnections between nodes in the hidden layer(s) 303) that minimize the cost function c. An example of such an optimization method is stochastic gradient descent.

In some embodiments, the various 3D ambisonic sounds generated by the tool 117 are defined as multi-layer audio assets in which each different layer is specified to define some attribute of the audio asset, with all of the different layers presented/applied in combination to convey the audio asset within the computer application. FIG. 4 shows an example schema 400 for defining a multi-layer audio asset, in accordance with some embodiments. The schema 400 shows that the multi-layer audio asset includes a number (L) of layers 401. Each layer 401 defines a particular feature or characteristic of the audio asset. In some embodiments, each layer 401 of the schema 400 includes a layer description 403 that identifies the relevance of the layer 401 to the audio asset. In some embodiments, each layer 401 of the schema 400 includes parameter settings 405 for a number of parameters ($P_{layerID}$) that define some part of the audio asset, where the number of parameters $P_{layerID}$ specified by a given layer 401 is greater than or equal to one. It should be understood that each layer 401 can have either the same number of parameters ($P_{layerID}$) or a different number of parameters ($P_{layerID}$). Also, it should be understood that the parameters that define a given layer 401 of the audio asset can be either the same as or different than the parameters that define other layers 401 of the audio asset. The parameters that define a given layer 401 of the audio asset are referred to as the metadata for the given layer 401.

FIG. 5 shows an example schema 500 for a multi-layer audio asset that provides sound for the horse 203 of FIGS. 2A and 2B, in accordance with some embodiments. This example audio asset is defined by 3 layers 501, including a layer 1 for the sound of horse hooves striking the ground, a layer 2 for the sound of horse breathing, and a layer 3 for the sound of the horse neighing. Each layer of this particular example, includes a Parameter 1 setting for the reference sound filename, a Parameter 2 setting for volume, and a Parameter 3 setting for equalization (EQ) settings. It should be appreciated that in other example embodiments, any of the layers of the example of FIG. 5 can include more or less audio parameter settings, such as filters, attenuators, reverb, oscillators, or any other audio parameter known in the art of sound design. Also, it should be understood that in other example embodiments, the horse audio asset of FIG. 5 can include either less or more than the three example layers. It should be understood that the example schema 500 of FIG. 5 is provided by way of example to illustrate the process of defining a multi-layer audio asset, but the example schema 500 of FIG. 5 does not in any way place any limitations on how other multi-layer audio assets can be defined and output by the tool 117.

In some embodiments, a system is disclosed herein for automatically generating an ambisonic soundfield. The system includes the input processor 121 configured to receive a specification of sound producing elements within a graphical scene, e.g., the scene description 109. In some embodiments, the graphical scene is generated by a video game. In some embodiments, the graphical scene is part of a cinematic production. The specification of the sound producing elements includes a description of each sound producing element and a position of each sound producing element within a 3D space relative to a virtual ambisonic microphone location within the graphical scene. The system also includes a library of sound effects, e.g., the sound effects 113. The system also includes the AI model 129 configured to automatically generate an ambisonic soundfield for the specification of sound producing elements within the graphical scene from the library of sound effects. The system also includes the output processor 123 configured to convey the ambisonic soundfield to the client computing system 103.

In some embodiments, the input processor 121 is configured to extract a direction of projection for each sound producing element within the 3D space relative to the virtual ambisonic microphone location within the graphical scene from the specification of sound producing elements within the graphical scene. In some embodiments, the specification of the sound producing elements includes a relative volume for each sound producing element within the graphical scene. In some embodiments, the AI model 129 is configured to automatically change the generated ambisonic soundfield over time in accordance with changes in the specification of sound producing elements within the graphical scene over time, e.g., in accordance with changes in the scene description 109 over time. In some embodiments, the output processor 123 is configured to create a DAW file that includes the ambisonic soundfield generated by the AI model 129. In some embodiments, the input processor 121 is configured to filter out one or more flagged sound producing elements within the specification of sound producing elements, e.g., within the scene description 109, to be ignored by the AI model 129. In some embodiments, the one or more flagged sound producing elements are identified in the processing instructions 111. In some embodiments, the AI model 129 is configured to generate metadata in conjunction with the ambisonic soundfield. The metadata includes a listing of different sounds from the library of sound effects, e.g., sound effects 113, that are used by the AI model 129 to generate the ambisonic soundfield. In some embodiments, the AI modeler engine 127 is configured to update the AI model 129 using the one or more adjustments made by the sound designer 101 to the AI-generated 3D ambisonic soundfield 115 output by the tool 117.

FIG. 6 shows a flowchart of a method for generating an ambisonic soundfield, in accordance with some embodiments. The method includes an operation 601 for providing a specification of sound producing elements within a graphical scene as input to an AI model. In some embodiments, the graphical scene is generated by a video game. In some embodiments, the graphical scene is part of a cinematic production. The specification of the sound producing elements includes a description of each sound producing element and a position of each sound producing element within a 3D space relative to a virtual ambisonic microphone location within the graphical scene. In some embodiments, the specification of the sound producing elements also includes a direction of projection for each sound producing element within the 3D space relative to the virtual ambisonic microphone location within the graphical scene. In some embodiments, the specification of the sound producing elements also includes a relative volume for each sound producing element within the graphical scene. The method also includes an operation 603 for providing a library of sound effects as input to the AI model. The method also includes an operation 605 for executing the AI model to automatically generate an ambisonic soundfield for the specification of sound producing elements within the graphical scene from the library of sound effects. The method also includes an operation 607 for conveying the ambisonic soundfield to a client computing system.

In some embodiments, the specification of sound producing elements within the graphical scene changes over time. In these embodiments, the ambisonic soundfield generated by the AI model also changes over time in accordance with the specification of sound producing elements within the graphical scene. In some embodiments, the method also includes creating a DAW file that includes the ambisonic soundfield as generated by the AI model. In some embodiments, the method includes flagging one or more sound producing elements within the specification of sound producing elements to be ignored by the AI model. In some embodiments, the AI model generates metadata in conjunction with the ambisonic soundfield. The metadata includes a listing of different sounds from the library of sound effects that are used by the AI model to generate the ambisonic soundfield. In some embodiments, the method includes receiving one or more adjustments made to the ambisonic soundfield by a sound designer, and updating the AI model using the one or more adjustments made to the ambisonic soundfield by the sound designer.

It should be appreciated that with the tool 117 disclosed herein, the trained AI model 129 can automatically generate 3D ambisonic soundfields for dynamically changing graphical scenes generated by a computer application, e.g., by a video game, which substantially reduces the time it takes for sound designers to create realistic soundfields for the computer application. The AI-driven tool 117 speeds up the sound design process and allows sound designers to generate improvements and variations on sounds with more precision and control.

Figure 7:
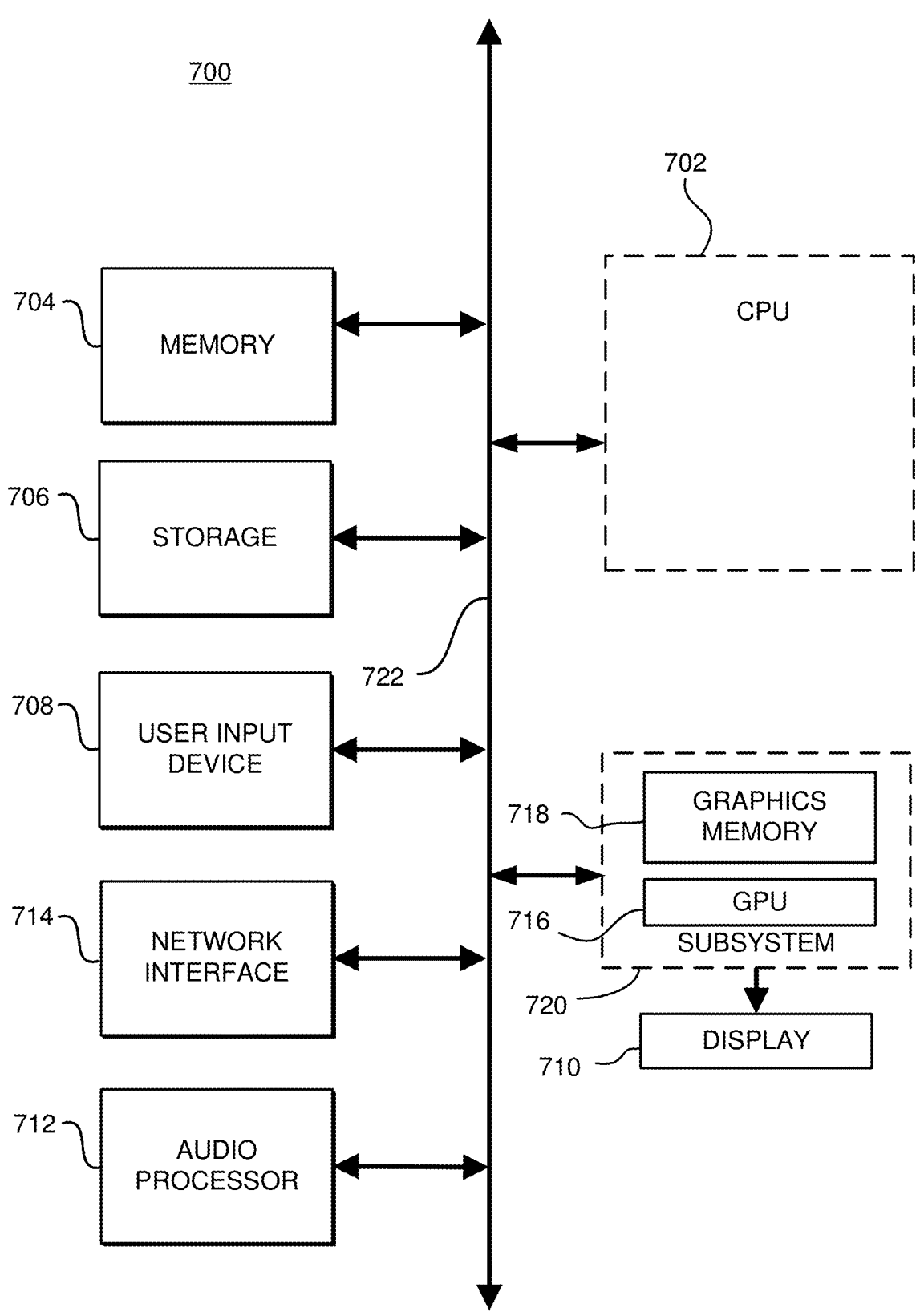
FIG. 7 illustrates components of an example server device within a cloud-based computing system that can be used to perform aspects of the tool of FIG. 1, in accordance with some embodiments.

FIG. 7 illustrates components of an example server device 700 within a cloud-based computing system that can be used to perform aspects of the tool 117, in accordance with some embodiments. This block diagram illustrates the server device 700 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be localized to a player playing a game segment (e.g., game console), or remote from the player (e.g., back-end server processor), or one of many servers using virtualization in the cloud-based gaming system 700 for remote streaming of game play to client devices.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 714, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU

716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. In addition to display device 710, the pixel data can be projected onto a projection surface. Device 700 can provide the display device 710 with an analog or digital signal, for example.

Implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A method for generating an ambisonic soundfield, comprising:
   providing a specification of sound producing elements within a graphical scene as input to an artificial intelligence model, the specification of the sound producing elements comprising one or more audio effects to be applied to each sound producing element, and a position of each sound producing element within a three-dimensional space relative to a virtual ambisonic microphone location within the graphical scene;
   providing a library of sound effects comprising one or more libraries of audio assets associated with the sound producing elements within a description of the graphical scene as input to the artificial intelligence model;
   executing the artificial intelligence model to automatically generate an ambisonic soundfield for the specification of sound producing elements within the graphical scene from the library of sound effects; and conveying the ambisonic soundfield to a client computing system to cause an audio processor of the client computing system to generate an audio output signal based on the ambisonics soundfield for playback.

2. The method as recited in claim 1, wherein the specification of the sound producing elements includes a direction of projection for each sound producing element within the three-dimensional space relative to the virtual ambisonic microphone location within the graphical scene.

3. The method as recited in claim 1, wherein the specification of the sound producing elements includes a relative volume for each sound producing element within the graphical scene.

4. The method as recited in claim 1, further comprising:
   creating a digital audio workstation file that includes the ambisonic soundfield.

5. The method as recited in claim 1, wherein the graphical scene is generated by a video game.

6. The method as recited in claim 1, wherein the graphical scene is part of a cinematic production.

7. The method as recited in claim 1, further comprising:
   flagging one or more sound producing elements within the specification of sound producing elements to be ignored by the artificial intelligence model.

8. The method as recited in claim 1, wherein the artificial intelligence model generates metadata in conjunction with the ambisonic soundfield, the metadata includes a listing of different sounds from the library of sound effects that are used by the artificial intelligence model to generate the ambisonic soundfield.

9. The method as recited in claim 1, further comprising:
   receiving one or more adjustments made to the ambisonic soundfield by a sound designer; and
   updating the artificial intelligence model using the one or more adjustments made to the ambisonic soundfield.

10. The method of claim 1, wherein the one or more audio effects comprise at least one of attenuation curves, reverb, oscillation, pan/tilt, or distortion.

11. A system for automatically generating an ambisonic soundfield, comprising:
   one or more processors; and
   one or more memories including instructions which, when executed on the one or more processors, causes the one or more processors to:
      receive a specification of sound producing elements within a graphical scene, the specification of the sound producing elements comprising one or more audio effects to be applied to each sound producing element, and a position of each sound producing element within a three-dimensional space relative to a virtual ambisonic microphone location within the graphical scene;
      receive a library of sound effects comprising one or more libraries of audio assets associated with the sound producing elements within a description of the graphical scene;
      execute an artificial intelligence model configured to automatically generate an ambisonic soundfield for the specification of sound producing elements within the graphical scene from the library of sound effects; and
      convey the ambisonic soundfield to a client computing system to cause an audio processor of the client computing system to generate an audio output signal based on the ambisonics soundfield for playback.

12. The system as recited in claim 11, wherein the one or more processors are further configured to extract a direction of projection for each sound producing element within the three-dimensional space relative to the virtual ambisonic microphone location within the graphical scene from the specification of sound producing elements within the graphical scene.

13. The system as recited in claim 11, wherein the specification of the sound producing elements includes a relative volume for each sound producing element within the graphical scene.

14. The system as recited in claim 11, wherein the one or more processors are further configured to create a digital audio workstation file that includes the ambisonic soundfield.

15. The system as recited in claim 11, wherein the graphical scene is generated by a video game.

16. The system as recited in claim 11, wherein the graphical scene is part of a cinematic production.

17. The system as recited in claim 11, wherein the one or more processors are further configured to filter out one or more flagged sound producing elements within the specification of sound producing elements to be ignored by the artificial intelligence model.

18. The system as recited in claim 11, wherein the artificial intelligence model is configured to generate metadata in conjunction with the ambisonic soundfield, the metadata includes a listing of different sounds from the library of sound effects that are used by the artificial intelligence model to generate the ambisonic soundfield.

19. The system as recited in claim 11, wherein the one or more processors are further configured to:

update the artificial intelligence model using one or more adjustments made to the ambisonic soundfield by a sound designer.

20. The system of claim 11, wherein the one or more audio effects comprise at least one of attenuation curves, reverb, oscillation, pan/tilt, or distortion.

* * * * *